(12) United States Patent
Ilan et al.

(10) Patent No.: US 8,094,786 B2
(45) Date of Patent: *Jan. 10, 2012

(54) METHOD AND SYSTEM FOR MONITORING AND RECORDING VOICE FROM CIRCUIT-SWITCHED SWITCHES VIA A PACKET-SWITCHED NETWORK

(75) Inventors: Tomer Ilan, Rosh Ha'ayin (IL); Eran Halbraich, Bet Zayit (IL); Ilan Yosef, Pardessiya (IL)

(73) Assignee: Nice Systems Ltd., Raanana (IL)

( * ) Notice: Subject to any disclaimer, the term of this patent is extended or adjusted under 35 U.S.C. 154(b) by 1011 days.

This patent is subject to a terminal disclaimer.

(21) Appl. No.: 12/025,489

(22) Filed: Feb. 4, 2008

(65) Prior Publication Data

US 2008/0212571 A1 Sep. 4, 2008

Related U.S. Application Data

(63) Continuation of application No. 10/450,265, filed as application No. PCT/IL01/01151 on Dec. 12, 2001, now Pat. No. 7,333,445.

(60) Provisional application No. 60/254,580, filed on Dec. 12, 2000.

(51) Int. Cl.
*H04M 1/24* (2006.01)
*H04M 3/08* (2006.01)
*H04M 3/22* (2006.01)

(52) U.S. Cl. ............... 379/32.01; 379/32.02; 379/35; 370/280; 370/294; 370/336; 370/337; 370/347; 370/442

(58) Field of Classification Search ............. 379/32.01, 379/32.02, 35; 370/280, 294, 336, 337, 347, 370/442
See application file for complete search history.

(56) References Cited

U.S. PATENT DOCUMENTS

| | | | |
|---|---|---|---|
| 4,815,120 A | 3/1989 | Kosich | |
| 5,351,287 A | 9/1994 | Bhattacharyya et al. | |
| 5,881,132 A | 3/1999 | O'Brien et al. | |
| 5,946,375 A | 8/1999 | Pattison et al. | |
| 6,363,145 B1 * | 3/2002 | Shaffer et al. | 379/265.02 |
| 6,744,865 B2 * | 6/2004 | Lahutsky | 379/102.01 |
| 6,839,323 B1 | 1/2005 | Foti | |

FOREIGN PATENT DOCUMENTS

| | | |
|---|---|---|
| EP | 0 996 295 | 4/2000 |
| WO | WO 99 17499 | 4/1999 |

(Continued)

OTHER PUBLICATIONS

Thorogood R., "Law Enforcement and Mobile Communications", IEE Colloquium on Mobile Communications Towards the Year 2000, IEE, london, GB, 1996, pp. 11-1-11-5.

*Primary Examiner* — Quynh Nguyen
(74) *Attorney, Agent, or Firm* — Pearl Cohen Zedek Latzer, LLP

(57) ABSTRACT

Some embodiments of the present invention are directed to a method and system for monitoring and recording voice from circuit-switched switches via a packet-switched network. A circuit-switched or VoIP recording system may record and/or live-monitor telephone calls by trunk and/or extension tapping over a packet-switched network. Alternatively, a circuit-switched or VoIP recording system may record and/or live-monitor telephone calls over a packet-switched network by activating the service observation feature of the circuit-switched switch either by feature code dialing or a computer telephony integration (CTI) link command.

16 Claims, 7 Drawing Sheets

FOREIGN PATENT DOCUMENTS

| | | |
|---|---|---|
| WO | WO 00/28773 | 5/2000 |
| WO | WO 00 42742 | 7/2000 |
| WO | WO 00/76188 | 12/2000 |
| WO | WO 01 89145 | 11/2001 |

* cited by examiner

METHOD AND SYSTEM FOR MONITORING AND RECORDING VOICE FROM CIRCUIT-SWITCHED SWITCHES VIA A PACKET-SWITCHED NETWORK

CROSS-REFERENCE TO RELATED APPLICATIONS

This application is a Continuation Application of U.S. patent application Ser. No. 10/450,265, filed on Jun. 12, 2003, now U.S. Pat. No. 7,333,445, which is a National Phase Application of PCT International Application No. PCT/IL01/01 151, International Filing Date Dec. 12, 2001, claiming priority of U.S. Provisional Application No. 60/254,580, filed on Dec. 12, 2000 all of which are being incorporated by reference herein in their entirety.

BACKGROUND OF THE INVENTION

Telephone call recording and monitoring systems are increasingly being used by businesses to monitor the effectiveness of agents who receive telephone calls. At present, the switching market is dominated by circuit-switched technologies, however VoIP recording systems designed to record VoIP packets are also available.

Existing circuit-switched telephone call recording systems installed in a circuit-switched environment may operate by tapping the extensions or trunks coupled to the circuit-switched switch. Alternatively, the recording system may use the service observation feature of the switch or a dedicated recording connection to observe silently an extension.

Usually, the recording and monitoring system is installed locally at the site of the switch. A locally installed system requires expensive dedicated hardware. Alternatively, an organization having multiple remote offices may hire dedicated expensive tie lines for storing the audio at a central location. It is not practical, however, to provide recording services by an application service provider (ASP) using dedicated expensive tie lines.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

Figure 1:
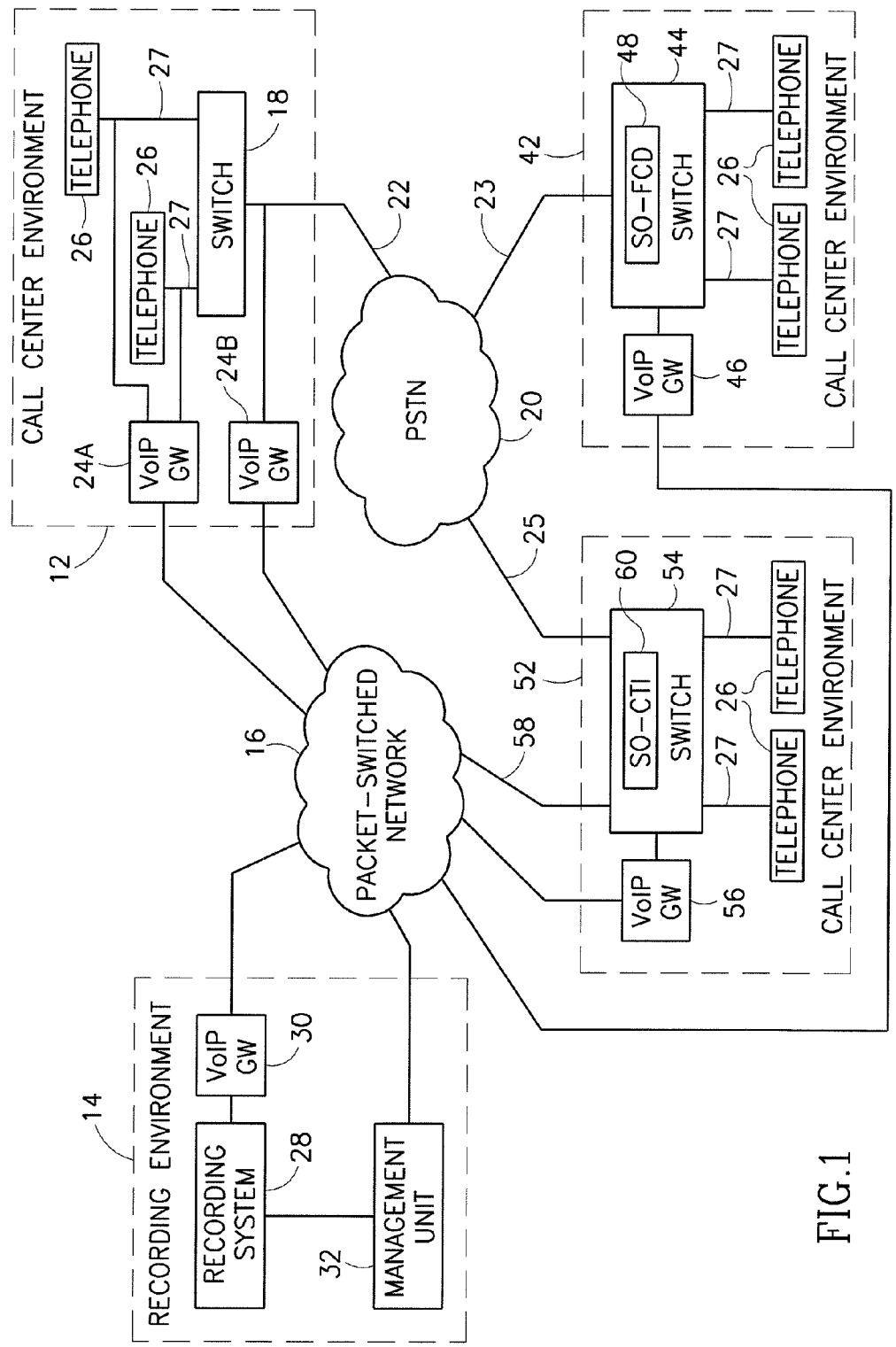
FIG. 1 is a block diagram of an environment having a circuit-switched recording system coupled to circuit-switched switches via a packet switch network according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some embodiments of the present invention are directed to remotely recording and monitoring by a single voice recording system, via a packet-switched network, telephone calls handled by circuit-switched switches. Other embodiments are directed to locally recording, via a packet-switched network, telephone calls handled by a circuit-switched switch. Non-limiting examples of a circuit-switched switch, which is coupled to a public switched telephone network (PSTN), include a private branch exchange (PBX), an automatic call distributor (ACD) a central office, and a trading floor switch.

The packet-switched network may be a local area network (LAN) or a wide area network (WAN) enabling remote recording of a single or multiple switches. Non-limiting examples of packet-switched networks may include Internet protocol (IP) networks, ATM networks, frame relay (FR) networks, DSL networks and ADSL networks.

For clarity, the following description sometimes uses the example voice over Internet protocol (VOIP) as a generic term for voice over packets (VoP) technologies. However, it will be appreciated by persons skilled in the art that embodiments of the invention are equally applicable to other VoP technologies, such as for example, VoATM and VoFR.

Various embodiments of the present invention will now be described. In some embodiments, which will be described hereinbelow with respect to FIG. 2, a circuit-switched recording and monitoring system may remotely record and/or monitor telephone calls by trunk and/or extension tapping over a packet-switched network. In other embodiments, which will be described hereinbelow with respect to FIGS. 3 and 4, a circuit-switched recording and monitoring system may record and/or monitor telephone calls over a packet-switched network by activating the service observation feature of the circuit-switched switch either by feature code dialing or a computer telephony integration (CTI) link command.

When the circuit-switched switch is coupled to the packet-switched network via a CTI link or a real time call detailed record (CDR) link, a selective recording based on call information is enabled. In these embodiments, the recording system may receive call information over the CTI or real time CDR link and may decide according to predefined criteria whether to record the call. Only audio from calls to be recorded are delivered over the packet-switched network In further embodiments, which will be described hereinbelow with respect to FIG. 5, a circuit-switched recording and monitoring system may record and/or monitor telephone calls over a packet-switched network from a circuit-switched switch coupled to the packet-switched network via a dedicated trunk.

In further embodiments, which will be described hereinbelow with respect to FIG. 7, a VoIP recording and monitoring system remotely or locally may record telephone calls over a packet-switched network. According to the circuit-switched switch handling the telephone call, the audio from the call may be captured by trunk and/or extension tapping over a packet-switched network or by activating the service observation feature of the circuit-switched switch either by feature code dialing or a computer telephony integration (CTI) link command. Alternatively, the audio may be delivered to the packet-switched network via a dedicated trunk coupled to the circuit-switched switch.

Reference is now made to FIG. 1, which is a block diagram illustration of an environment having a circuit-switched recording and monitoring system coupled to circuit-switched switches via a packet-switched network according to some embodiments of the present invention. In the exemplary illustration of FIG. 1, a call center environment 12, a call center environment 42, a call center environment 52, and a recording environment 14, each coupled to a packet-switched network 16, are shown. It should be understood that generally one or more call center environments might be coupled to via the packet switch network to the recording environment.

Call center environment 12 may comprise a circuit-switched switch 18 coupled to a public switched telephone network (PSTN) 20 via at least one trunk 22 and to a packet-switched network 16 via one or more VoIP switch-gateways 24. VoIP gateway 24 may be implemented as software, hardware, or any combination thereof. Such a VoIP gateway may be an external device coupled to the switch, such as commercially available from AudioCodes of Yehud, Israel. Alternatively, VoIP gateway may be implemented as a switch card, commercially available from Avaya of Basking Ridge, N.J., USA.

Call center environment 12 may further comprise a plurality of agent telephone stations 26, each coupled to circuit-switched switch 18 via an extension line 27. Telephone stations 26 may be either analog or digital stations.

VoIP gateway 24A may be coupled in parallel to each extension line 27. When a call is transferred from PSTN 20 via trunk 22 to circuit-switched switch 18, which routes the call to a specific telephone station 26, VoIP gateway 24A may tap the extension line 27 coupled to the specific telephone station 26, capture the audio and deliver it via packet-switched network 16 to recording environment 14.

VoIP gateway 24B may be coupled to trunk 22. When a call is transferred from PSTN 20 via trunk 22 to circuit-switched switch 18, which routes the call to one of telephone stations 26, VoIP gateway 24B may tap the trunk, capture the audio and deliver it via packet-switched network 16 to recording environment 14.

Recording environment 14 may comprise a circuit-switched voice recording and monitoring system 28 coupled to packet-switched network 16 via a VoIP recording-gateway 30 and a network management unit 32 coupled to system 28 and to packet-switched network 16. Alternatively, system 28 may comprise only recording capabilities or live monitoring capabilities. Circuit-switched voice recording and monitoring system 28 may be any available recording and monitoring system, such as, for example, Nice Logging System, manufactured by Nice Systems Ltd. of Ra'anana, Israel.

Figure 2:
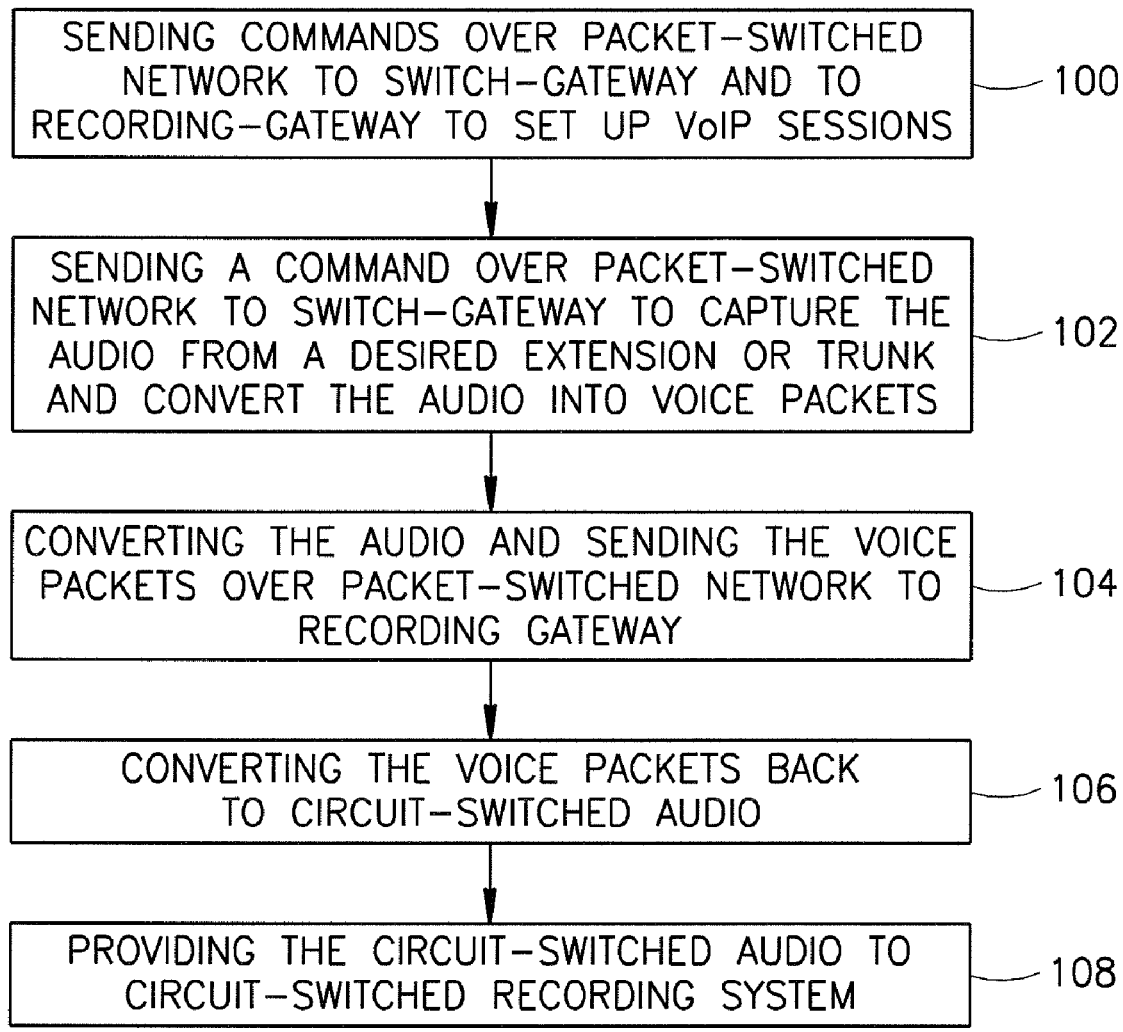
FIG. 2 is a simplified flowchart illustration of a method of recording over a packet-switched network a telephone call from a circuit-switched switch by trunk and/or extension tapping according to some embodiments of the present invention.

Reference is additionally made to FIG. 2, which is a simplified flowchart illustration of a method of recording a telephone call from call center environment 12 of FIG. 1 according to some embodiments of the present invention. In one method described in FIG. 2, the audio handled by switch 18 may be captured by gateway 24B by tapping trunk 22. In this method, only audio from incoming calls received at switch 18 from PSTN 20 via trunk 22 or outgoing calls delivered from switch 18 to PSTN 20 via trunk 22 may be captured. In another method described in FIG. 2, the audio may be captured by gateway 24A by tapping an extension line 27 coupled to a particular telephone station 26. In this method, also audio from internal calls between telephone stations 26 may be captured by gateway 24A.

According to some embodiments of the present invention, network management unit 32 may send commands via packet-circuit network 16 to VoIP gateways 24 and 30 to establish VoIP sessions between gateway 30 and gateway 24 over network 16 (step 100). These sessions may be used to deliver voice between circuit-switched switch 18 and recording system 28.

Network management unit 32 may send a command to one of gateways 24 to convert the audio of the required extension line 27 or trunk 22 to voice packets and to switch the voice packets to one of the available VoIP sessions (step 102). Then, gateway 24 may convert the audio and may send the voice packets to gateway 30 over packet-switched network 16 (step 104). Gateway 30 may convert the received voice packets back to circuit-switched audio (step 106). The circuit-switched audio may then be provided to circuit-switched recording system 28 for recording and/or live monitoring (step 108).

Referring back to FIG. 1, call center environment 42 having a circuit-switched switch that enables service observation by feature code dialing will now be described.

According to some embodiments of the present invention, call center environment 42 may comprise a circuit-switched switch 44 coupled to PSTN 20 via at least one trunk 23 and to packet-switched network 16 via a VoIP switch-gateway 46. VoIP gateway 46 may be implemented as software, hardware, or any combination thereof. Circuit-switched switch 44 may comprise a "service observation by code dialing" module 48. VoIP gateway 46 may activate service observation module 48 for observing the extension line 27 coupled to the specific telephone station 26 by using a code-dialing feature.

Figure 3:
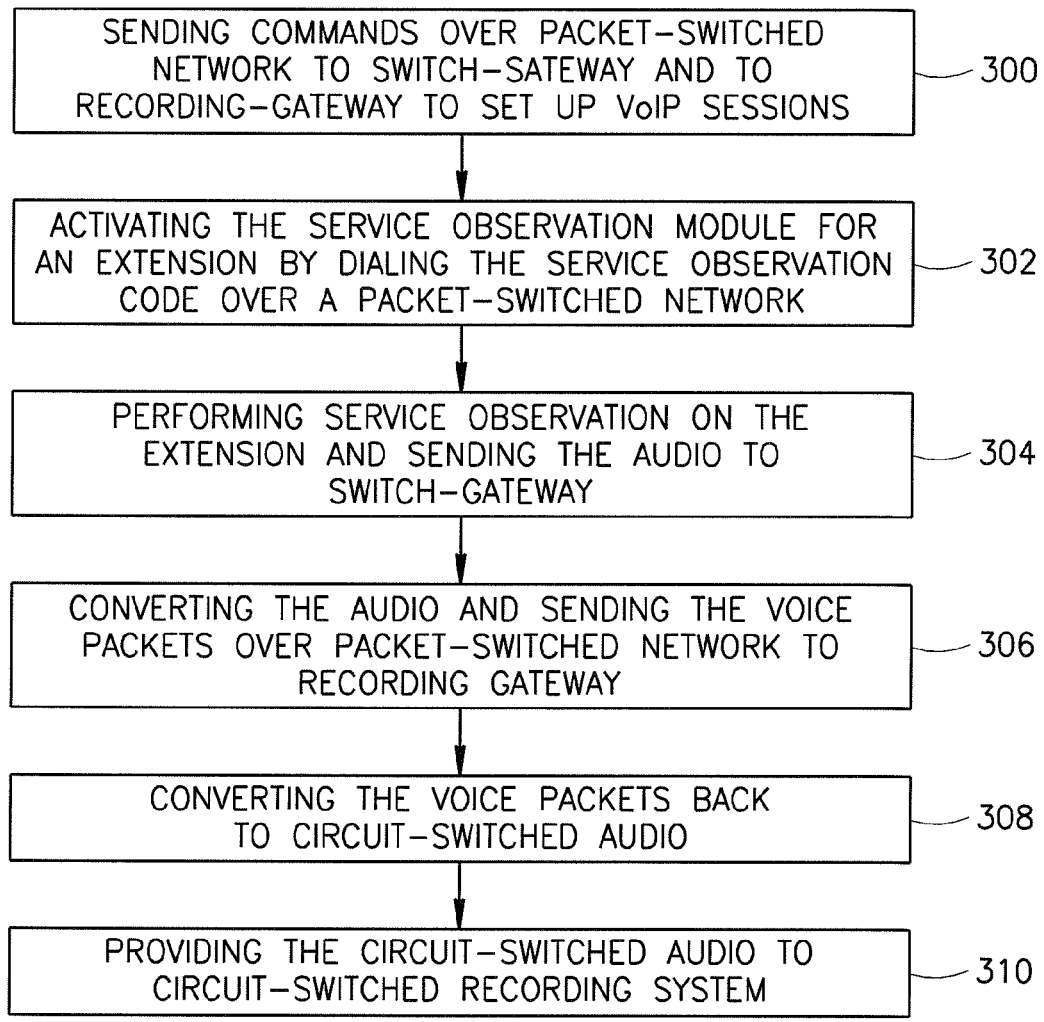
FIG. 3 is a simplified flowchart illustration of a method of recording over a packet-switched network a telephone call from a circuit-switched switch by activating the service observation module using the code dialing feature according to some embodiments of the present invention.

Reference is additionally made to FIG. 3, which is a simplified flowchart illustration of a method of recording a telephone call from call center environment 42 of FIG. 1 according to some embodiments of the present invention. This method enables the recording system to record audio from an incoming call, an outgoing call or an internal call delivered over any extension line 27 without having a physical connection between the VoIP gateway and the extension lines. The code-dialing feature may enable selective recording of telephone calls according to a time-schedule or other information stored in the recording system.

In the method described in FIG. 3, network management unit 32 may send commands via packet-switched network 16 to VoIP gateways 46 and 30 to establish VoIP sessions between gateway 30 and gateway 46 over network 16 (step 300). These sessions may be used to deliver voice from circuit-switched switch 44 to recording system 28. The audio handled by switch 44 may be captured by gateway 46 by entering the service observation module.

Voice recording system 28 may activate the service observation module 48 for a desired extension line 27 by dialing the service observation code over packet-switched network 16 via VoIP gateway 46 (302). Circuit-switched switch 44 may perform the service observation on the desired extension 27 and may send the audio to VoIP gateway 46 (304). VoIP gateway 46 may convert the audio to voice packets and may send the voice packets to gateway 30 over packet-switched network 16 (step 306). Gateway 30 may convert the received voice packets back to circuit-switched audio (step 308). The circuit-switched audio may then be provided to circuit-switched recording system 28 for recording and/or live monitoring (step 310).

Referring back to FIG. 1, call center environment 52 having a circuit-switched switch coupled to a packet-switched network via a VoIP gateway and a CTI link enabling service observation by CTI link command will now be described.

According to some embodiments of the present invention, call center environment 52 may comprise a circuit-switched switch 54 coupled to PSTN 20 via at least one trunk 25 and to packet-switched network 16 via a VoIP switch-gateway 56. VoIP gateway 56 may be implemented as software, hardware, or any combination thereof. Circuit-switched switch 54 may be additionally coupled to packet-switched network 16 via a CTI link 58. Alternatively, circuit-switched switch 54 may be additionally coupled to packet-switched network 16 via a real-time CDR link.

The CTI link or real time CDR link may enable switch 54 to receive commands over packet-switched network 16. It may also enable the recording system to receive information relating to a telephone call from switch 54 for determining according to predefined criteria whether to record the specific telephone call. Non-limiting examples of such criteria include the identity of the agent, the identity of the client, and more. Only audio from calls that recording system 28 decides to record may be transferred via VoIP 56 over packet-switched network 16. The CTI link or real time CDR link may also enable selective recording of telephone calls according to a time-schedule or other information not received from the circuit-switched switch.

Circuit-switched switch 54 may comprise a service observation by CTI link command dialing module 60. The service observation module for the specific extension line may be activated by a CTI link command or a real time CDR command sent over packet-switched network 16.

Figure 4:
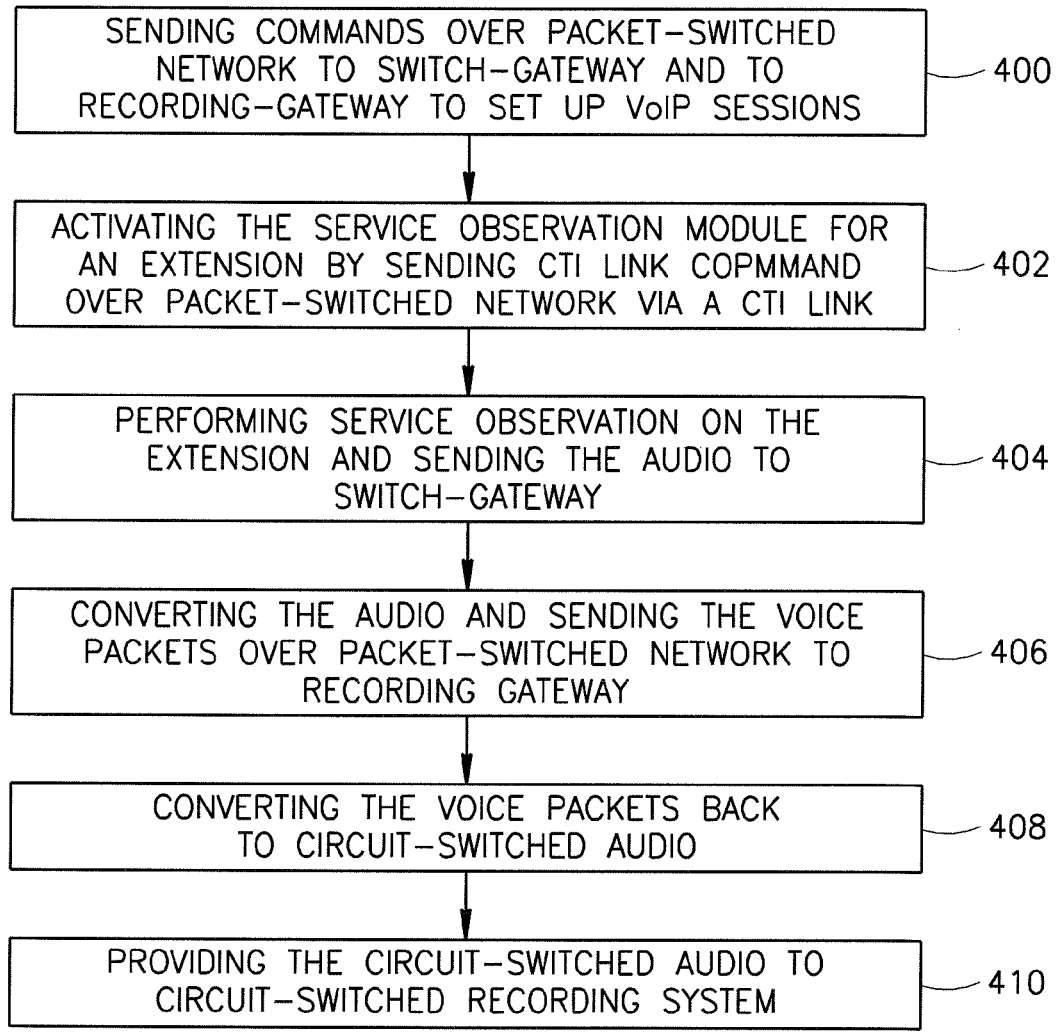
FIG. 4 is a simplified flowchart illustration of a method of recording over a packet-switched network a telephone call from a circuit-switched switch by activating the service observation module using a CTI link command according to some embodiments of the present invention.

Reference is additionally made to FIG. 4, which is a simplified flowchart illustration of a method of recording a telephone call from call center environment 52 of FIG. 1 according to some embodiments of the present invention. This method enables the recording system to record audio delivered over any extension line 27 from an incoming call, an outgoing call or an internal call without having a physical connection between the VoIP gateway and the extension lines.

In the method described in FIG. 4, network management unit 32 may send commands via packet-circuit network 16 to VoIP gateways 56 and 30 to establish VoIP sessions between gateway 30 and gateway 56 over network 16 (step 400). These sessions may be used to deliver voice from circuit-switched switch 54 to recording system 28.

Voice recording system 28 may activate the service observation module 60 for observing a desired extension line 27 by sending a CTI command over packet-switched network 16 via CTI link 58 (402). Circuit-switched switch 54 may perform the service observation on the desired extension 27 and may send the audio to VoIP gateway 56 (404). VoIP gateway 56 may convert the audio to voice packets and may send the voice packets to gateway 30 over packet-switched network 16 (step 406). Gateway 30 may convert the received voice packets back to circuit-switched audio (step 408). The circuit-switched audio may be then provided to circuit-switched recording system 28 for recording and/or live monitoring (step 410).

Figure 5:
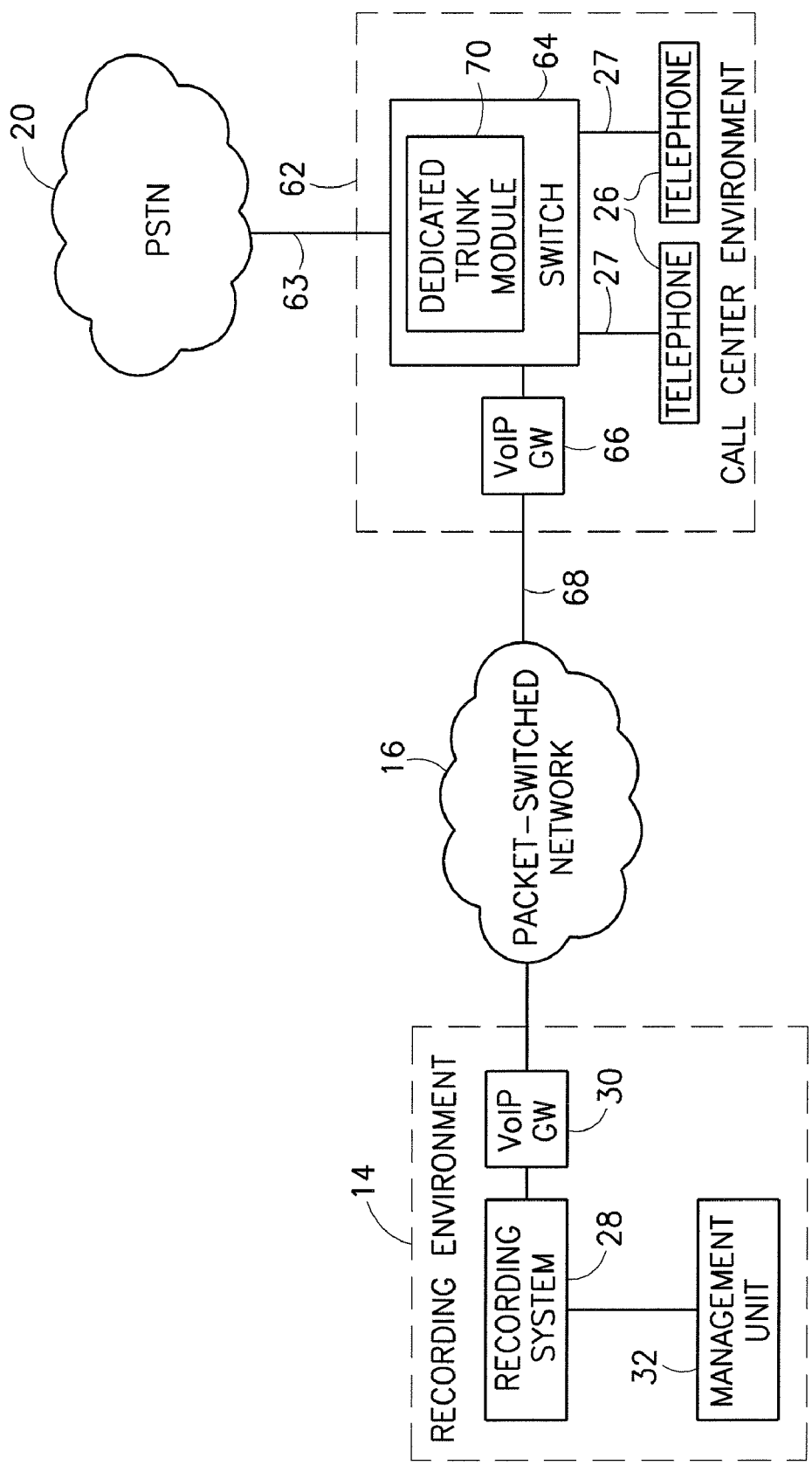
FIG. 5 is a block diagram of an environment having a circuit-switched recording system coupled to a circuit-switched switch via a packet switch network according to some embodiments of the present invention.

Reference is now to FIG. 5, which is a block diagram illustration of an environment having a circuit-switched recording system coupled to a circuit-switched switch via a packet-switched network according to some embodiments of the present invention. In the exemplary illustration of FIG. 5, a call center environment 62 and a recording environment 14 both coupled to packet-switched network 16, are shown. It should be understood that generally one or more call center environments might be coupled to via the packet switch network to the recording environment.

Call center environment 62 may comprise a circuit-switched switch 64 coupled to PSTN 20 via at least one trunk 63 and to packet-switched network 16 via a dedicated trunk 68 and a VoIP switch-gateway 66. VoIP gateway 66 may be implemented as software, hardware, or any combination thereof. Circuit-switched switch 64 may comprise a "dedicated trunk" module 70 implemented in software, hardware or a combination thereof enabling audio from trunk 63 and/or extension lines 27 to be delivered automatically to dedicated trunk 68. Dedicated trunk 68 may deliver the audio from trunk 23 and/or extensions 27 over packet-switched network to recording system 28 on a regular basis without receiving specific commands from the recording system 28. Such dedicated trunks 68 are suitable, for example, for a trading floor switch.

Figure 6:
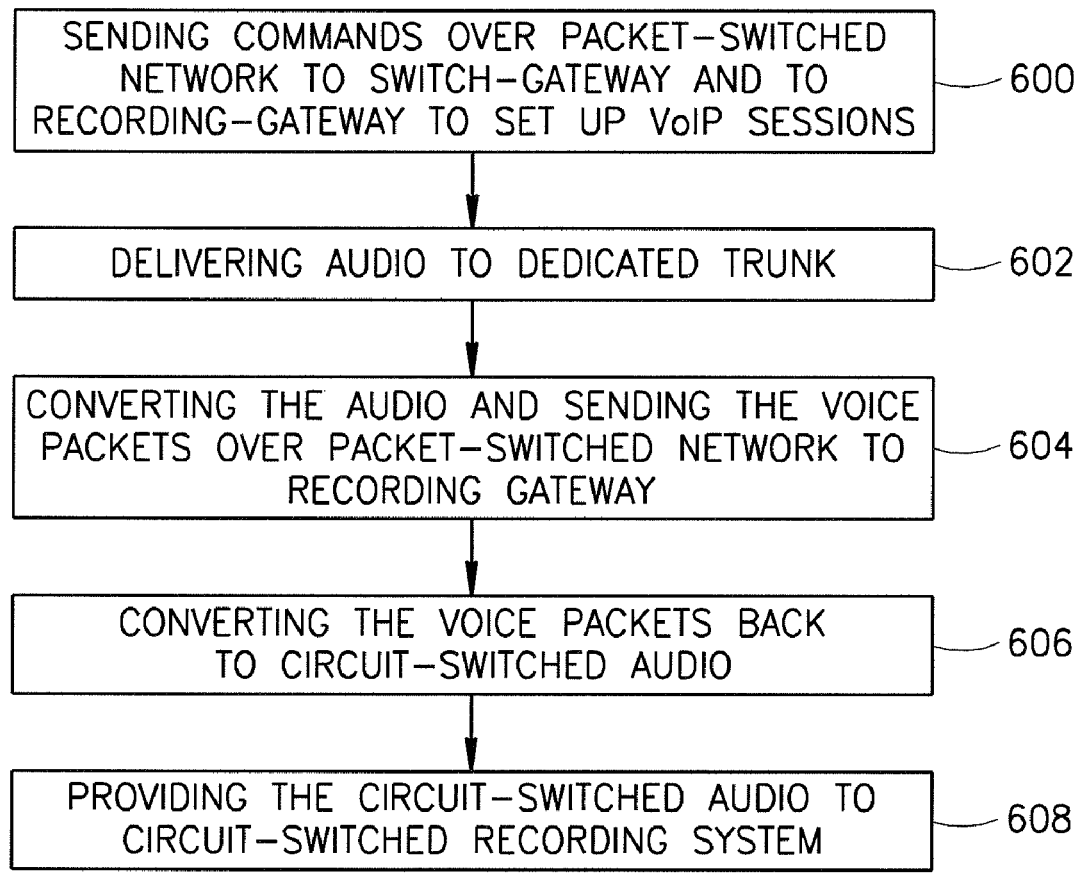
FIG. 6 is a simplified flowchart illustration of a method of recording over a packet-switched network a telephone call from the circuit-switched switch of FIG. 5.

Reference is additionally made to FIG. 6, which is a simplified flowchart illustration of a method of recording a telephone call from call center environment 62 of FIG. 5 according to some embodiments of the present invention. This method enables the recording system to record audio from an incoming call, an outgoing call or an internal call without sending specific commands to VoIP gateway 66.

In the method described in FIG. 6, network management unit 32 may send commands via packet-circuit network 16 to VoIP gateways 66 to establish VoP sessions between gateway 30 and gateway 66 over network 16 (step 600). These sessions may be used to deliver voice between circuit-switched switch 64 and recording system 28.

Audio from trunk 63 and/or extension lines 27 may be delivered to dedicated trunk 68 (step 602). Then, gateway 66 may convert the audio and may send the voice packets to gateway 30 over packet-switched network 16 (step 604). Gateway 30 may convert the received voice packets back to circuit-switched audio (step 606). The circuit-switched audio may then be provided to circuit-switched recording system 28 for recording and/or live monitoring (step 608).

Figure 7:
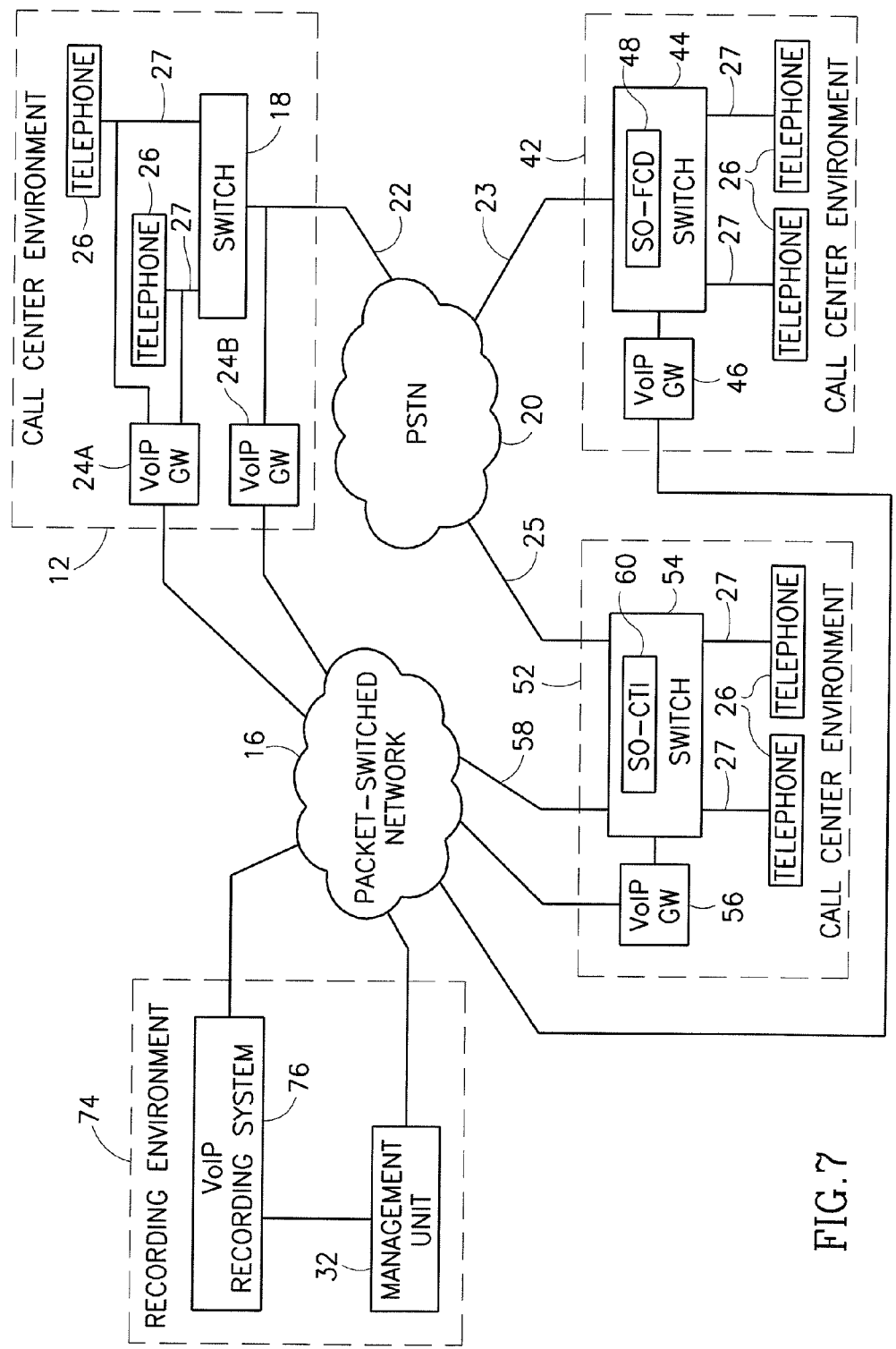
FIG. 7 is a block diagram illustration of an environment having a VoIP recording system coupled to circuit-switched switches via a packet switch network, according to some embodiments of the present invention.

Reference is now made to FIG. 7, which is a block diagram illustration of an environment having a VoIP recording and monitoring system coupled to circuit-switched switches via a packet-switched network according to some embodiments of the present invention. In the exemplary illustration of FIG. 7, call center environment 12, call center environment 42, call center environment 52, and a VoIP recording environment 74, each coupled to packet-switched network 16, are shown. It should be understood that generally one or more call center environments might be coupled via the packet switch network to the recording environment, including call center environment 62. In particular, VoIP recording may enable local selective recording and live-monitoring of a single circuit-switched switch without the need for proprietary hardware, such as trunk and extension interface boards, and without the need for a direct physical connection to each extension line.

VoIP recording environment 74 may comprise a VoIP recording and monitoring system 76 coupled directly to packet-switched network 16. VoIP recording system 76 may be able to receive and record voice packets thus eliminating the need for a VoIP gateway. Network management unit 32 may send commands either directly or via packet-circuit network 16 to VoIP recording system 76 and via packet-circuit network 16 to one of VoIP switch-gateways 24, 46, 56, and 66 to establish VoIP sessions over network 16. These sessions may be used to deliver voice from one of circuit-switched switches 18, 44, 54 and 64 to VoIP recording system 76.

VoIP recording system 76 may be any available VoIP recording system, such as, for example, Nice VoIP Logging System, manufactured by Nice Systems Ltd. of Ra'anana, Israel. According to these embodiments, VoIP sessions may be established between VoIP one of switch-gateways 24, 46, 66, 56, and VoIP recording system 76. The VoIP switch-gateway may convert the circuit-switched audio into Voice packets. The voice packets may then be delivered over packet-switched network 16 to VoIP recording system 76 for recording.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for monitoring telephone calls handled by a circuit-switching switch coupled to a packet-switch network via a first voice over Internet Protocol (VoIP) telephony gateway and to a public switched telephone network, the method comprising:
   receiving by a recording system via the packet-switch network a computer telephony integration (CTI) datum associated with a telephone call handled by the circuit-switching switch; and
   if the CTI datum meets at least one predefined monitoring condition:
      sending instructions to establish a VoIP session between the first VoIP telephony gateway and a second VoIP telephony gateway coupled to the recording system, wherein the instructions are sent from the recording system;
      sending instructions from the recording system to the circuit-switching switch to deliver packets of audio associated with the telephone call to the first VoIP telephony gateway coupled to the switch; and
      receiving by the recording system via the packet-switch network at least a portion of the telephone call.

2. The method of claim 1 comprising:
   recording at least the portion of the telephone call.

3. The method of claim 1 comprising:
   performing live-monitoring of at least the portion of the telephone call.

4. The method of claim 1 comprising:
   sending instructions over the packet-switch network to tap an extension line coupled to the circuit-switching switch; and
   receiving, over the packet-switch network, audio data of telephone calls delivered over the extension line.

5. The method of claim 1 comprising:
   sending instructions over the packet-switch network to tap a trunk coupled to the circuit-switching switch; and
   receiving, over the packet-switch network, audio data of telephone calls delivered over the trunk.

6. The method of claim 1 comprising:
   sending instructions over the packet-switch network to observe an extension line coupled to the circuit-switching switch; and
   receiving, over the packet-switch network, telephone calls delivered over the extension line.

7. The method of claim 6, wherein sending the instructions comprises dialing via the packet-switch network a code to perform a service observation of the extension line.

8. The method of claim 6, wherein sending said instructions comprises instructing the circuit-switching switch to perform a service observation of the extension line using a CTI link.

9. A method for monitoring telephone calls handled by a circuit-switching switch coupled to a packet-switch network via a first voice over Internet Protocol (VoIP) telephony gateway and to a public switched telephone network, the method comprising:
   receiving by a recording system via the packet-switch network a real-time call detailed record (CDR) datum associated with a telephone call handled by the circuit-switching switch; and
   if the CDR datum meets at least one predefined monitoring condition:
      sending instructions to establish a VoIP session between the first VoIP telephony gateway and a second VoIP telephony gateway coupled to the recording system, wherein the instructions are sent from the recording system;
      sending instructions from the recording system to the circuit-switching switch to deliver packets of audio associated with the telephone call to the first VoIP telephony gateway coupled to the switch; and
      receiving by the recording system via the packet-switch network at least a portion of the telephone call.

10. The method of claim 9 comprising:
    recording at least the portion of the telephone call.

11. The method of claim 9 comprising:
    performing live-monitoring of at least the portion of the telephone call.

12. The method of claim 9 comprising:
    sending instructions over the packet-switch network to tap an extension line coupled to the circuit-switching switch; and
    receiving, over the packet-switch network, audio data of telephone calls delivered over the extension line.

13. The method of claim 9 comprising:
    sending instructions over the packet-switch network to tap a trunk coupled to the circuit-switching switch; and
    receiving, over the packet-switch network, audio data of telephone calls delivered over the trunk.

14. The method of claim 9 comprising:
    sending instructions over the packet-switch network to observe an extension line coupled to the circuit-switching switch; and
    receiving, over the packet-switch network, telephone calls delivered over the extension line.

15. The method of claim 14, wherein sending the instructions comprises dialing via the packet-switch network a code to perform a service observation of the extension line.

16. The method of claim 14, wherein sending said instructions comprises instructing the circuit-switching switch to perform a service observation of the extension line using a CTI link.

* * * * *